(No Model.)

G. C. MOORE.
PNEUMATIC TIRE.

No. 575,551. Patented Jan. 19, 1897.

Witnesses

Inventor
G. C. Moore,
By Attorney

UNITED STATES PATENT OFFICE.

GEORGE C. MOORE, OF WORCESTER, MASSACHUSETTS, ASSIGNOR TO THE AMERICAN TIRE COMPANY, LIMITED, OF TORONTO, CANADA.

PNEUMATIC TIRE.

SPECIFICATION forming part of Letters Patent No. 575,551, dated January 19, 1897.

Application filed September 26, 1895. Serial No. 563,785. (No model.)

*To all whom it may concern:*

Be it known that I, GEORGE C. MOORE, a citizen of the United States, residing at Worcester, in the county of Worcester and State of Massachusetts, have invented certain new and useful Improvements in Pneumatic Tires, of which the following is a specification.

My invention relates to pneumatic tires for bicycles, &c., and more particularly to a detachable tire; and the object of my invention is to provide a tire which can be readily and easily removed from the rim of the wheel and from which the inner air-tube can be removed and repaired without removing the wheel from the frame; also a tire which will bind or clamp on any crescent rim without any metallic appliances or mechanical devices to attach it to the rim.

My tire consists of an inner rubber air-tube, with closed or sealed ends, a separate textile jacket or tube in which the rubber tube is inserted, and an endless shoe or cover which incloses the air-tube and jacket and attaches the same to the rim.

My invention consists in certain novel features of construction of my improved detachable tire, as will be hereinafter fully described, and the nature thereof indicated by the claims.

Figure 1:
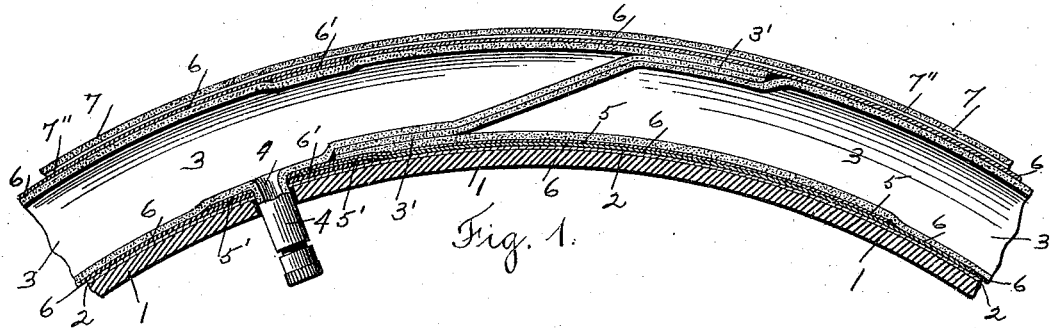
Figure 2:
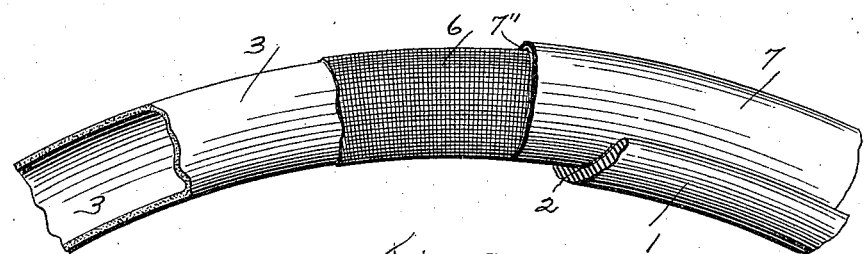
Figure 3:
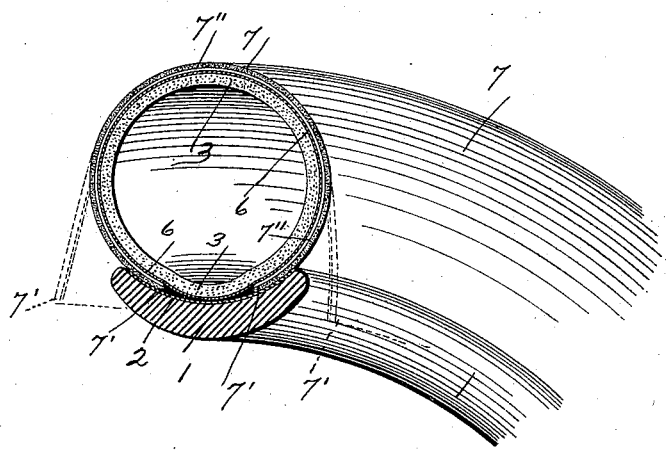

Referring to the drawings, Figure 1 is a central longitudinal section through a portion of my improved tire and of the rim and valve at the point where the meeting ends of the inner tube and the inclosing textile jacket are connected. Fig. 2 is a detached section of the tire and rim, taken at one side of the valve portion, with a portion of the inner tube, the inclosing jacket, and the shoe or cover broken away; and Fig. 3 is, on an enlarged scale, a cross-sectional view through the tire and rim. The dotted lines represent the edges of the endless shoe or cover detached from the rim.

In the accompanying drawings, 1 is a portion of the rim of a wheel, preferably made of wood and of the ordinary crescent shape in cross-section, and preferably provided upon its exterior curved surface intermediate the rim and tire with emery or other suitable material, to furnish a friction or non-slipping surface for the inner surface of the tire.

The tire consists of an inner rubber air-tube 3, with closed and sealed ends 3', which in this instance overlap each other, as shown in Fig. 1, to form the joint or connection between the ends of the inner air-tube 3, which joint or connection is at the point where the valve is attached to the tire. One of the sealed ends of the inner air-tube 3 is in this instance extended or provided with a strip of textile or other material 5 upon its inner surface, the free end 5' of which extends beyond the sealed end of the rubber tube and is provided with a perforation therein through which the valve 4 extends, as shown in Fig. 1. By this construction the ends of the inner tube are connected.

Inclosing the inner air-tube 3 is a textile jacket or tube 6, in which the said inner tube 3 is inserted. Said textile jacket or tube 6 is of tubular shape or circular in cross-section and not open longitudinally, and is preferably made as set out in my Patent No. 523,365, of July 24, 1894, consisting of a self-shaped tube composed of two unequal longitudinal segments, the large segment having its greatest length at mid-width thereof and its minimum length in its marginal portions at both sides of such length, as set out in said patent, to which reference is made. The ends of the textile jacket or tube 6 overlap each other in this instance, as shown at 6', Fig. 1, and the valve 4 extends through a hole or perforation in each end of said jacket upon its inner surface, which comes against the rim of the wheel, and acts to hold the two ends of the jacket together.

An endless rubber shoe or cover 7 incloses the air-tube 3 and its textile jacket or tube 6. The shoe or cover 7 is not tubular, but is open longitudinally upon its inner side, with free edges 7', which are adapted to be inserted between the textile jacket 6 and the edges of the rim 1, as shown in Fig. 3. The shoe or cover 7 consists of an outer rubber covering and an inner textile lining 7''. The inner textile lining 7'' consists of a self-shaped tube, corresponding to the self-shaped textile tube 6, except that in the case of the lining 7'' it is cut or split longitudinally to leave the edges free.

By means of the self-shaped lining 7'' of the outer shoe or cover 7 said cover is made to assume a cylindrical or tubular shape when it is applied to the inner air-tube, and the edges of the outer shoe or cover 7 are inserted between the edges of the rim and the outer surface of the air-tube 3 and its jacket 6 to secure said tube and jacket, and also the shoe or cover 7, to the rim, as shown in Fig. 3.

By the construction of the textile jacket or tube 6 and the lining 7" of the shoe or cover 7 said shoe or cover is securely attached to the rim without the employment of any metallic appliances or mechanical devices and without making the edges of the shoe or cover thicker than the rest thereof, and is prevented from slipping or creeping by means of emery or other suitable frictional material. The tire will be bound or clamped to the rim in its expanded condition and also in its collapsed condition.

In order to remove the tire from the rim in case of puncture or for any other reason, one edge of the outer shoe or cover 7 is disconnected from the rim by running a tool or other device along the outer edge of the rim or in any other suitable way. The air-tube 3 and its jacket 6 are then free to be removed from the rim by disengaging the valve 4 from the rim and disengaging the end 5' of the inner tube 5 and the ends of the textile jacket 6 from the valve 4. The inner air-tube 3 can be withdrawn from the jacket 6 through one end thereof and said tube repaired without removing the wheel from the frame.

After the rubber tube 3 is repaired it is inserted in the jacket 6 and the ends of the jacket secured to the valve 4 and the jacket and valve placed on the rim and the shoe or cover 7 placed thereon and secured thereto by inserting the edges of said cover between the edges of the rim and the jacket 6, as above stated and shown in Fig. 3.

The advantages of my improved tire will be readily appreciated by those skilled in the art. It can be applied to any crescent rim, and the tire can be removed and repaired without removing the wheel from the frame.

It will be understood that the details of construction of some of the parts of my pneumatic tire may be varied, if desired. For example, instead of using a non-endless inner rubber air-tube 3 with sealed ends, as shown in Fig. 1, I may use an endless tube, the textile jacket or tube being placed on said tube before the ends are connected together for an endless tube.

Having thus described my invention, what I claim as new, and desire to secure by Letters Patent, is—

1. A tire, comprising an inner air-tube, a textile tube extending over said inner tube, said textile tube consisting of a self-shaped tube, composed of two unequal segments, the large segment having its greatest length at mid-width, and its minimum length in its marginal portions at both sides of such length, and an endless shoe or cover which incloses said textile tube, said shoe or cover consisting of a self-shaped tube split longitudinally, and composed of two unequal longitudinal segments, the large segment having its greatest length at mid-width, and its minimum length in its marginal portions at both sides of such length, and having free edges, which are inserted between the edges of the rim and the textile tube, to secure the tire to the rim, substantially as set forth.

2. A tire, comprising an inner rubber air-tube with sealed ends adapted to overlap each other, and one end extended and provided with an opening or hole through which the valve extends to connect said ends, a self-shaped textile jacket or tube for said inner tube made separate therefrom, with the ends adapted to overlap each other, and provided at their inner portion with holes through which the valve extends, to connect said ends, and a self-shaped endless shoe or cover to inclose said inner tube and jacket, said shoe or cover having a self-shaped textile lining, and free edges adapted to be inserted between the edges of the rim and the jacket of the inner tube, to secure the same to the rim, substantially as set forth.

GEO. C. MOORE.

Witnesses:
 JOHN C. DEWEY,
 M. J. GALVIN.